United States Patent
Nakatate et al.

(10) Patent No.: US 7,209,617 B2
(45) Date of Patent: Apr. 24, 2007

(54) PROCESSING METHOD FOR AN IMAGE FIBER

(75) Inventors: Kenichi Nakatate, Sakura (JP); Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/323,139

(22) Filed: Dec. 30, 2005

(65) Prior Publication Data

US 2006/0104581 A1 May 18, 2006

Related U.S. Application Data

(63) Continuation of application No. 10/330,527, filed on Dec. 26, 2002, now Pat. No. 7,072,548.

(30) Foreign Application Priority Data

Sep. 2, 2002 (JP) ............................ P2002-256504

(51) Int. Cl.
*G02B 6/06* (2006.01)
*G02B 6/00* (2006.01)

(52) U.S. Cl. ...................................... 385/116; 385/115

(58) Field of Classification Search ...................... None
See application file for complete search history.

(56) References Cited

U.S. PATENT DOCUMENTS 4,011,069 A  3/1977  Cole et al.

FOREIGN PATENT DOCUMENTS

| DE | 196 49 045 A1 | 5/1998 |
| JP | 56-111818 A1 | 9/1981 |
| JP | 61-252505 | 11/1986 |
| JP | 3-081717 | 4/1991 |
| JP | 10-123411 | 5/1998 |
| JP | 2000-185931 | 7/2000 |

*Primary Examiner*—Sung Pak
(74) *Attorney, Agent, or Firm*—Darby & Darby

(57) ABSTRACT

In the present invention, a deformation process is applied to a part of an image fiber, and when implementing improvement of the quality of the transmitted image, the improvement of the image quality in the center region and peripheral region of the image fiber in the radial direction is carried out to an equal degree, and a uniform improvement of the entire screen can be carried out. A processed part is formed having a deformation of all cores that is substantially identical by deforming in the radial direction or by deforming and twisting a part of an image fiber having a plurality of cores that function as pixels in the radial direction thereof. The image fiber can be manufactured by a processing in which by a part of the image fiber having a plurality of cores that function as pixels is heated, and deformed in the radial direction thereof or simultaneously deformed and twisted in the radial direction thereof this heated part.

13 Claims, 3 Drawing Sheets

PROCESSING METHOD FOR AN IMAGE FIBER

This application is a continuation of U.S. patent application Ser. No. 10/330,527, filed Dec. 26, 2002 now U.S. Pat. No. 7,072,548.

BACKGROUND OF THE INVENTION

1. Field of the Invention

The present invention relates to a processing method in which a processing is carried out that deforms a part of an image fiber in the radial direction, wherein the deformation of the cores forming the image fiber and functioning as pixels becomes substantially identical for all the cores, and the improvement in the image quality at the center region and the peripheral region of the image fiber in the radial direction becomes substantially identical.

2. Description of the Related Art

Conventionally, the center region of an image fiber used in a fiber scope, for example, is heated and softened, and by carrying out a twisting process in which the image fiber is twisted or a bending process in which the image fiber is bent, improvement in the image quality of the transmitted image and inversion or the like of image direction can be carried out.

In particular, where the object is improvement of the quality of the transmitted image, there is a method of applying a twist having a small pitch to a part of the image fiber. Thereby, the core that functions as a pixel is twisted, the clad mode of the transmitted light from the curved part of this core is dispersed to the outside, the light that becomes noise is eliminated, and thereby, the contrast in the image can be increased.

However, when applying such a twist with a small pitch, as is schematically shown in FIG. 7, the amount of deformation of the core at the center part 1a of the image fiber 1 in the radial direction becomes smaller than the amount of deformation of the core at the peripheral region 1b. Thus, when trying to sufficiently improve the image quality at the center region 1a, if the amount of the twist becomes large, the amount of deformation of the core at the peripheral region 1b becomes excessive, and there is a concern that the image may be broken up, and the quality of the image at the peripheral region 1b, to the contrary, deteriorates.

For example, Japanese Patent No. 2925173, Japanese Unexamined Patent Application, First Publication, No. 2000-185931, Japanese Examined Patent Application, Second Publication, No. Hei 6-42008, and Japanese Unexamined Patent Application, First Publication, No. Hei 10-123411 disclose a related art to carrying out such a deformation process on image fibers.

Thus, the problem to be solved by the present invention is applying a deforming process to a part of the image fiber, and when implementing an improvement of the quality of the transmitted image, the improvement of the image quality at the center region and the peripheral region of the image fiber in the radial direction is substantially identical, and thereby a uniform improvement of the entire screen is attained.

SUMMARY OF THE INVENTION

In order to achieve the object, the present invention provide a processed image fiber comprising a processed part which is obtainable by deforming a part of the image fiber having a plurality of cores that function pixels in the radial direction such that the deformation of all cores is substantially identical.

In the processed image fiber, it is preferable for the processed part to be twisted in circumferential direction while the deformation in the radial direction.

In addition, in the processed image fiber, it is also preferable for the processed part to be covered by a protective member.

According to the processed image fiber, the improvement of the image quality in the peripheral region and the center region in the radial direction of the processed image fiber can be uniformly carried out. Therefore, it is possible to obtain a high quality image over the entire screen.

In addition, in order to achieve the object, the present invention provide a processing method comprising the steps of: heating a part of the image fiber having a plurality of cores that function as pixels; deforming the heated part in the radial direction thereof; and forming a processed part having a deformation of all cores that is substantially identical.

In the processing method, it is preferable for the heated part to be twisted while deforming in the radial direction thereof.

According to the processing method of the image fiber of this invention, the improvement in the image quality in the peripheral region and the center region in the radial direction of the image fiber can be carried out uniformly, and thereby it is possible to manufacture an image fiber that can transmit a high quality image over the entire screen.

Furthermore, in order to achieve the object, the present invention provide a processing apparatus for an image fiber comprising: a heating device that heats a part of an image fiber; and a deforming device that applies a deformation to a part of the image fiber that has been heated by the heating device in the radial direction thereof.

In the processing apparatus, it is preferable to further comprise a twisting device that applies a twist to a part of the heated image fiber.

According to the processing apparatus for the image fiber of this invention, the above-described processing method can be easily implemented.

DESCRIPTION OF THE PREFERRED EMBODIMENTS

Below, the invention will be explained in detail.

Figure 1:
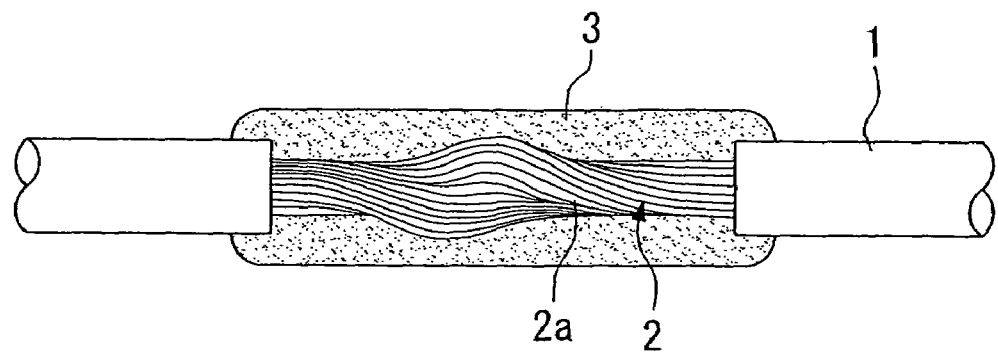
FIG. 1 is a side view having a portion cut away schematically showing an example of the processed image fiber of the present invention.

FIG. 1 schematically shows an example of the processed image fiber of the present invention. In FIG. 1, reference number 1 denotes the image fiber. In this image fiber 1, a plurality of silicon core-cladding type optical fibers are bundled, fused, fastened, and integrated while preserving their alignment. The image fiber 1 has a circular cross-section, a diameter of 0.1 to 5 mm, and is used in a typical fiberscope or the like.

A processed part 2 is formed on a portion of this image fiber 1 in the longitudinal direction, and thereby the image fiber 1 becomes the processed image fiber.

In this processed part 2, this portion of the image fiber 1 becomes deformed in the radial direction thereof, or is both deformed in the radial direction thereof and twisted in the circumferential direction. In addition, the amount of deformation of each of the cores in the processed part 2 becomes substantially identical at all locations from the center region to the peripheral region of the image fiber 1.

Figure 2:
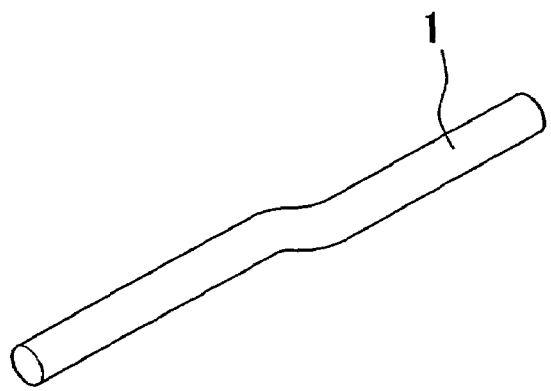
FIG. 2 is a perspective diagram showing a portion of the deformation in the radial direction in the present invention.
Figure 3:
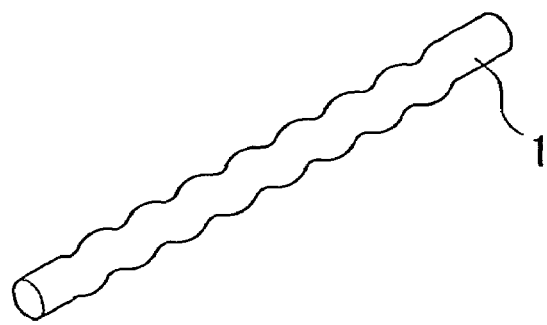
FIG. 3 is a perspective drawing showing another example of the deformation in the radial direction in the present invention.

Here, as shown, for example, in FIG. 2, "deformed in the radial direction" denotes a state wherein the image fiber 1 is gently bent twice within an identical plane, a type of step is formed, and the center axis of the image fiber 1 is offset in parallel, or as shown in FIG. 3, a state wherein the image fiber 1 is gently twisted, it acquires a small spiral shape, and the center axis of the image fiber 1 is folded.

In addition, "twisted in the circumferential direction" denotes either fixing one of the portions of either side of the part of the image fiber 1 that will become the processed part 2 and turning the other in the circumferential direction, or turning both sides in mutually opposite directions in the circumferential direction.

The amount of this turning when twisting in this circumferential direction is typically about 0.3 to 1 rotations (in terms of rotation angle, from 100 to 360 degrees), but this range is not limiting, and depending, for example, on the degree of the improvement of the image quality, can be appropriately determined. In particular, when the amount of rotation is 0.5 of one rotation, the direction of the image can be inverted, and the lens system can be simplified when incorporated into an image scope.

Because a deformation in the radial direction may be applied, or both a deformation in the radial direction and a twisting in the circumferential direction may be applied simultaneously to the processed part 2, as is shown schematically in FIG. 1, each of the optical fibers 2a of the actual processed part 2 acquire the shape of a spiral.

In addition, the length of the processed part 2 is about 5 to 50 mm, the thickness is about 0.1 to 10 mm, but these ranges are not limiting.

Furthermore, the deformation of the core at this processed part 2 is substantially identical at all locations of the image fiber 1 in the radial direction. While the position of each core changes and acquires a spiral shape in the longitudinal direction thereof due to the deformation in the radial direction and the twisting in the circumferential direction, the cross-sectional shape of each core itself has almost no deformation, warping, or strain. In addition, reference numeral 3 in FIG. 1 denotes the protective member that protects the processed part 2. Because the formation of the processed part 2 involves heating with a heat source such as an oxy-hydrogen burner, an electric heater, laser light, an electrical discharge or the like, this protective member 3 is provided in order to protect the optical fiber when it is exposed after removal of the protective covering.

For this protective member 3, synthetic resins such as silicon resin, polyimide resin, epoxy resin, urethane resin, or olefin resin can be used; metals such as stainless steel, aluminum alloys, or copper alloys can be used; ceramics such as oxidized aluminum, oxidized silicon, or oxidized zirconium can be used; glasses such as quartz or thermo resistant glass can be used; or fiber reinforced plastics and the like can be used. In addition, when the protective member 3 is formed by being covered with the above-described synthetic resins, a relatively soft one is obtained. A relatively rigid protective member 3 is obtained by forming a pipe shape or chute shape that comprise metal, ceramic, glass, fiber reinforced plastics, or the like, and mounting these onto the processed part 2.

Next, the processing method for the image fiber will be explained.

Figure 4:
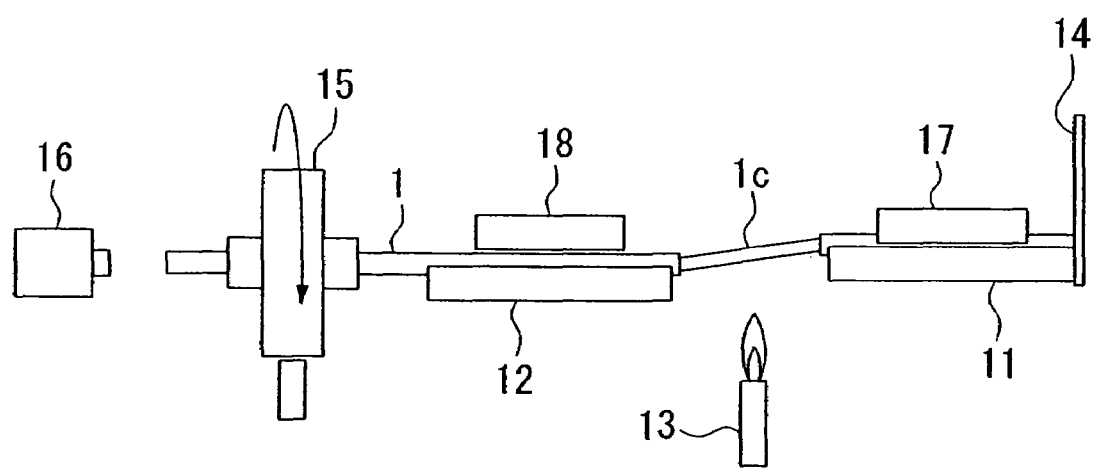
FIG. 4 is a schematic structural drawing showing an example of the processing apparatus of the present invention.

FIG. 4 shows an example of the processing apparatus used in this processing method. In the figure, reference numeral 11 denotes a first V groove base. A second V groove base 12 is provided disposed at a predetermined spacing from this first V groove base 11, and the first and second V groove bases 11 and 12 are installed on a stage (not illustrated). In addition, the V groove bases 11 and 12 are both square shaped plates, and in the center of the upper surface, one straight V groove is formed. The image fiber 1 is accommodated in this V groove. In addition, a first restraining member 17 and a second restraining member 18 that fasten the image fiber 1 accommodated in the V grooves are respectively provided on the first V groove base 11 and the second V groove base 12.

Between and below the first V groove base 11 and the second V groove base 12, as a heat source an oxy-hydrogen burner 13 is provided so as to be able to move. In addition, a target 14 for determining the rotation position is provided on the side of the first V groove base 11. Furthermore, on the side of the second V groove base 12, a twisting apparatus 15 is provided. This twisting apparatus 15 applies a twisting to the image fiber 1 by holding the image fiber 1 and rotating it in the circumferential direction.

In addition, at the side of the twisting apparatus 15, a television camera 16 is provided. This television camera 16 picks up the target 14 via the image fiber 1 as an image, and monitors the degree of the twisting, or in other words, the degree of rotation, of the processed part 2. Depending on the results of this rotation, the degree of the twisting of the image fiber 1 due to the twisting apparatus 15 can be controlled.

Furthermore, the first V groove base 11 and the second V groove base 12 are disposed so as to have a positional relationship slightly offset in parallel or a positional relationship that is slightly shifted so that the center line of the V groove of the other V groove base is not aligned. As shown in FIG. 4, they have a positional relationship that is offset in parallel in a vertical direction, and in order to clarify this relationship, it is illustrated in a slightly exaggerated manner.

In the structure of this processing apparatus, the oxy-hydrogen burner 13 forms the heating device, the first and second V groove bases 11 and 12 form the deformation device, and the twisting apparatus 15 forms the twisting device.

To process the image fiber using this processing apparatus, first, the protective covering of the processed part of the image fiber 1 is removed, the part 1c of the image fiber 1 having the protective cover removed is positioned over the oxy-hydrogen burner 13, the image fiber 1 is accommodated in each of the V grooves of the first and second V groove bases 11 and 12, and simultaneously inserted into and held by the twisting apparatus 15.

Next, the image fiber 1 accommodated in each of the V grooves of the first V groove base 11 and the second V groove base 12 is pressed between the first restraining member 17 and the second restraining member 18. At this time, in the first restraining member 17, the image fiber 1 is rigidly pressed and fastened so that it cannot rotate, and in the second restraining member 18, the image fiber 1 is gently pressed and fastened to a degree that does not prevent its rotation.

Next, the processed part 1c of the image fiber 1 is heated by the oxy-hydrogen burner 13. At this time, the oxy-hydrogen burner 13 is moved back and forth longitudinally along the image fiber 1, and a range broader than that of the processed part 1c is heated uniformly.

The processed part 1c of the image fiber 1 softened due to the heat is naturally deformed in the radial direction because, as described above, the first V groove base 11 and the second V groove base 12 are disposed so as to be offset. That is, the image fiber 1 is forcibly bent and elastically deformed before heating, but after having been heated, due to softening, this elastic deformation state transforms to a plastic deformation state, and a permanent deformation remains in the radial direction.

Simultaneously, the other end of the image fiber 1 is rotated by the twisting apparatus 15, and the twisting is applied to the softened processed part 1c. At this time, the amount of twisting is adjusted while monitoring the image of the target 14 picked up by the television camera 16. When a predetermined twisting has been applied, the heating by the oxy-hydrogen burner 13 is ended.

Finally, as described above, the processed part 2 formed in this manner is covered with the protective member 13, and thereby the processed image fiber is manufactured.

In addition, in the processing apparatus shown in FIG. 4, a deformation can simply be applied only in the radial direction of the image fiber 1 by using a processing apparatus omitting the twisting apparatus 15.

In such a processed image fiber, a deformation in the radial direction is applied or a deformation in the radial direction and a twisting in the circumferential direction are simultaneously applied to the processed part 2, and because the deformation of each of the cores is of a substantially identical degree in the peripheral region and central region of the image fiber 1, the image quality is improved due to the noise light scattering uniformly and the image quality over the entire screen is improved to the same extent.

In addition, by applying the twisting, the direction of the image can be changed arbitrarily, and when used as a fiberscope, the objective lens system or the ocular lens system can be simplified. Furthermore, because the diameter of the processed part 2 does not increase, the diameter when serving as an image fiber 1 does not increase, and the processed part 2 does not lengthen.

In addition, in comparison to implementing only a twisting or a bending process, variation in the amount of light occurs with difficulty. Furthermore, because a small processed part 2 can be formed, if a protective part comprising a synthetic resin is provided, one can be manufactured that exhibits a flexibility identical to that of a normal image fiber.

Figure 5:
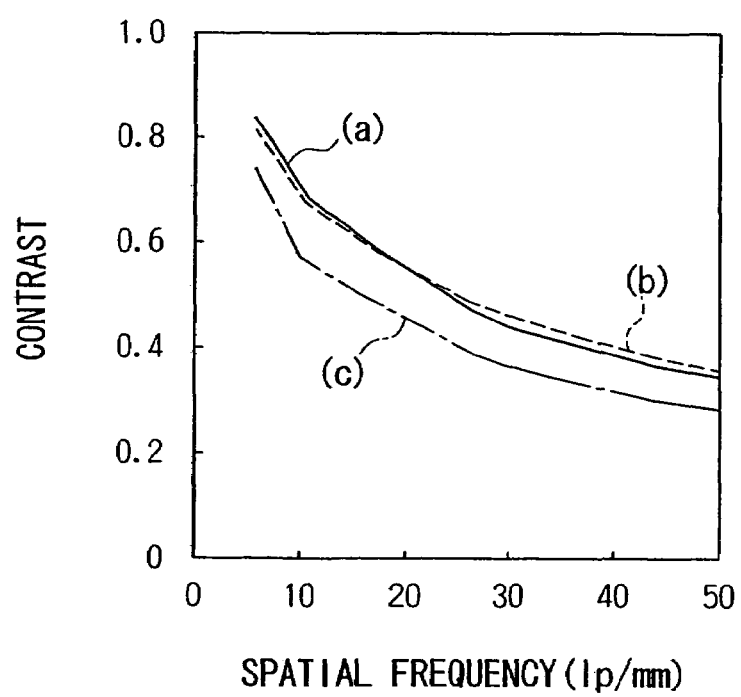
FIG. 5 is a chart showing an example of the effect of the improvement in the image quality in the present invention.

FIG. 5 shows the contrast as a transmission characteristic of the processed image fiber obtained in this manner. In FIG. 5, (a) shows the contrast at the peripheral region of the processed image fiber; (b) shows the contrast at the center region of the processed image fiber; and (c) shows the contrast of the image fiber before processing.

From the graph in FIG. 5, it can be understood that the contrast was improved uniformly over the screen as a whole in this processed image fiber.

Figure 6:
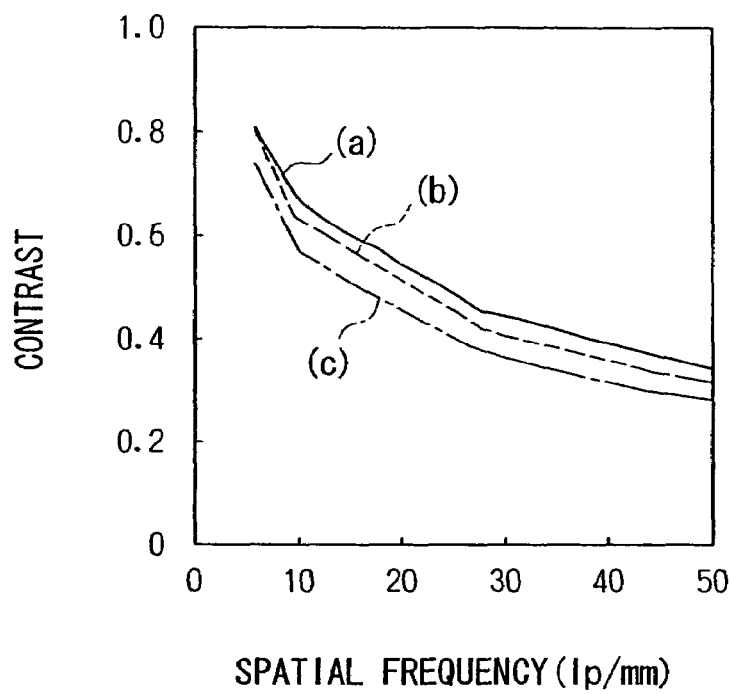
FIG. 6 is a chart showing the effect of the improvement in the image quality according to the conventional technology.
Figure 7:
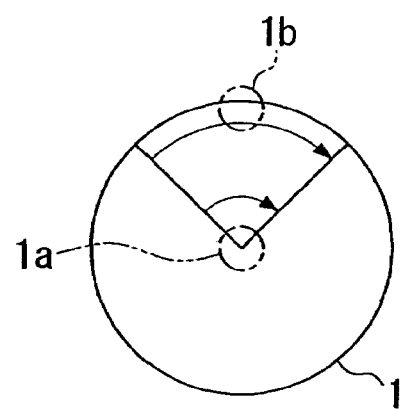
FIG. 7 is an explanatory drawing for explaining the typical amount of deformation in the peripheral region and the center region of the image fiber.

In contrast, FIG. 6 shows the contrast of an image fiber having applied only the conventional strong twist. In FIG. 6, (a) shows the contrast at the peripheral region of the image fiber; (b) shows the contrast at the center region of the processed image fiber; and (c) shows the contrast of the image fiber before twisting.

From the graph in FIG. 6, it can be understood that the degree of improvement in the contrast at the peripheral region and the central region differs in the image fiber having only this twisting applied.

In the present invention, the processing method and apparatus therefore that have been described above can also take various other forms, such as those described below.

First, the processing of the processed part 2 is possible with apparatuses other than that described above. For example, manual processing is also possible. In addition, the oxy-hydrogen burner 13 can be fixed and the image fiber 1 can be moved in the longitudinal direction thereof.

In addition, a structure is possible in which the twisting apparatus 15 is omitted, the second V groove base 12 is made to rotate, and thereby the twisting is applied. In addition, the twisting apparatus 15 and the second V groove base 12 can be integrated. Furthermore, in addition to the method in which the deformation in the radial direction is applied by offsetting the two V groove bases 11 and 12, the two V groove bases 11 and 12 can be disposed coaxially, and the image fiber 1 that is in a heated state can be deformed in the radial direction by applying a force to the processed part of the image fiber 1 using an arm for deformation.

It is also possible to dispose either only the first V groove base 11 or the second V groove base 12 on stage that can move in three dimensions, and apply the deformation to the image fiber 1 in the radial direction by appropriately moving the first V groove base 11 or the second V groove base 12 in the X direction, Y direction, or Z direction. Furthermore, instead of offsetting the two V groove bases 11 and 12, the deformation in the radial direction can be applied by offsetting in parallel or diagonally the position of the V groove formed in the V groove bases 11 and 12.

In addition, the mechanism for holding the image fiber 1 is not limited to a combination of V grooves and the first and second restraining members 17 and 18. Any structure is possible if it holds the image fiber. Furthermore, the shape of the processed part 2 can be a coil spring made by enlarging the spiral shape.

What is claimed is:

1. A processed image fiber comprising:
   a processed part which is formed by deforming a part of an image fiber having a plurality of cores that function as pixels in a radial direction of the image fiber and by twisting the processed part of the image fiber in a direction along the circumference of the image fiber such that the deformation of all cores is substantially identical, and each core in the processed part has a spiral shape.

2. A processed image fiber according to claim 1, wherein the processed part is covered by a protective member.

3. A processing method comprising the steps of:
   heating a part of an image fiber having a plurality of cores that function as pixels; and
   twisting the heated part in a direction along the circumference thereof while deforming the heated part in a radial direction thereof thereby forming a processed part in which deformation of all cores is substantially identical and each core in the processed part has a spiral shape.

4. A processed image fiber according to claim 1, wherein the processed part comprises a spiral portion formed therein by twisting the part of the image fiber, and each core in the spiral portion has a spiral shape, whereby the processed part of the image fiber is deformed in the radial direction of the image fiber.

5. A processed image fiber according to claim 1, wherein in the processed part of the image fiber an end thereof is twisted with respect to the other end thereof by a rotation angle of 100 to 360 degrees.

6. A processed image fiber according to claim 1, wherein the processed part has a length of 5 to 50 mm and a thickness of 0.1 to 10 mm.

7. A processing image fiber according to claim 1 wherein the processed port has been deformed and twisted at the same time.

8. A processing method according to claim 3, wherein the heated part of the image fiber is bent twice within one plane when the heated part of the image fiber is deformed in the radial direction thereof to form a stepped portion and the center axes of the image fiber on both sides of the step portion are offset from each other.

9. A processing method according to claim 3, wherein during the heating step the heated part of the image fiber is twisted when the heated part of the image fiber is deformed in the radial direction thereof to form a spiral portion such that each core in the spiral portion has a spiral shape.

10. A processing method according to claim 3, wherein, in the processed part of the image fiber an end thereof is twisted with respect to the other end thereof by a rotation angle of 100 to 360 degrees when the heated part is twisted in the direction along the circumference thereof.

11. a processing method according to claim 3, wherein the processed part has a length of 5 to 50 mm and a thickness of 0.1 to 10 mm.

12. A processed fiber as claimed in claim 1 wherein each of said plurality of cores is clad and the cladded cores of said processed part are bundled and fused together with the alignment being preserved after deforming and twisting.

13. A processing method as claimed in claim 3 wherein each of said plurality of cores is cladded and further comprising the step of:

bundling and fusing said plurality of cladded cores together while preserving the alignment of the radially deformed and twisted cores in the heated part of the fiber.

* * * * *